US008959202B2

(12) United States Patent
Haitsma et al.

(10) Patent No.: US 8,959,202 B2
(45) Date of Patent: Feb. 17, 2015

(54) GENERATING STATISTICS OF POPULAR CONTENT

(75) Inventors: Jaap Andre Haitsma, Eindhoven (NL); Gerrit Cornelis Langelaar, Veldhoven (NL); Mehmet Utku Celik, Eindhoven (NL); Martijn Maas, Eindhoven (NL)

(73) Assignee: Civolution B.V., AE Eindhoven (NL)

( * ) Notice: Subject to any disclaimer, the term of this patent is extended or adjusted under 35 U.S.C. 154(b) by 1186 days.

(21) Appl. No.: 12/922,580

(22) PCT Filed: Mar. 18, 2009

(86) PCT No.: PCT/NL2009/000064
§ 371 (c)(1),
(2), (4) Date: Nov. 19, 2010

(87) PCT Pub. No.: WO2009/116856
PCT Pub. Date: Sep. 24, 2009

(65) Prior Publication Data

US 2011/0066723 A1 Mar. 17, 2011

(30) Foreign Application Priority Data

Mar. 18, 2008 (EP) .................................... 08152875

(51) Int. Cl.
*G06F 15/173* (2006.01)
*G06Q 30/00* (2012.01)

(52) U.S. Cl.
CPC ...................................... *G06Q 30/00* (2013.01)
USPC .... 709/224; 713/176; 713/180; 707/E17.009; 725/18; 725/9

(58) Field of Classification Search
CPC ............ G06Q 30/00; G06F 17/307432; G06F 17/30755
USPC ........... 709/224; 713/176, 180; 707/E17.009; 725/18, 9
See application file for complete search history.

(56) References Cited

U.S. PATENT DOCUMENTS 8,386,299 B2 * 2/2013 Kumble ....................... 705/7.35
2005/0066352 A1 * 3/2005 Herley ............................ 725/19
2005/0091367 A1 * 4/2005 Pyhalammi et al. .......... 709/224
2007/0124756 A1 * 5/2007 Covell et al. .................... 725/18
2007/0208711 A1 * 9/2007 Rhoads et al. .................... 707/3
2007/0297417 A1 * 12/2007 Cohen et al. ............. 370/395.42

(Continued)

FOREIGN PATENT DOCUMENTS

WO 2004/010353 1/2004

*Primary Examiner* — Alina N Boutah
(74) *Attorney, Agent, or Firm* — Barnes & Thornburg LLP

(57) ABSTRACT

Client terminals report an easy-to-calculate identifier such as the Internet URL or a cryptographic hash of the content to a server. The server collects and counts the reported identifiers so as to obtain preliminary statistics. By aggregating these reported identifiers into the preliminary statistics, identifiers are revealed that are likely popular content. The server selects one or more identifiers from the preliminary statistics and makes these available to at least a subset of clients. The clients that obtain these one or more identifiers then access content and compute the easy-to-calculate identifiers as usual. If the computed identifier matches one of the identifiers obtained from the server, the client will additionally extract a watermarked identifier or compute a digital fingerprint of the content in question and report this to the server. The server then uses the received identifier or fingerprint to create final statistics by aggregating the preliminary statistics.

14 Claims, 2 Drawing Sheets

(56) References Cited

U.S. PATENT DOCUMENTS

| | | | | |
|---|---|---|---|---|
| 2008/0051070 | A1* | 2/2008 | Dharmaji | 455/414.1 |
| 2008/0274687 | A1* | 11/2008 | Roberts et al. | 455/3.06 |
| 2009/0006543 | A1* | 1/2009 | Smit | 709/203 |
| 2009/0092183 | A1* | 4/2009 | O'Hern | 375/240.01 |
| 2009/0298480 | A1* | 12/2009 | Khambete et al. | 455/414.1 |
| 2010/0005104 | A1* | 1/2010 | DiMaria et al. | 707/10 |
| 2012/0059845 | A1* | 3/2012 | Covell et al. | 707/769 |
| 2013/0198242 | A1* | 8/2013 | Levy | 707/803 |

* cited by examiner

GENERATING STATISTICS OF POPULAR CONTENT

CROSS-REFERENCE TO RELATED APPLICATIONS

The present application claims the benefit of priority to International Patent Application No. PCT/NL2009/000064 filed 18 Mar. 2009, which further claims the benefit of priority to European Patent Application No. 08152875.4 filed 18 Mar. 2008, the contents of which are incorporated herein by reference in their entirety.

FIELD OF THE INVENTION

The invention relates to generating statistics with respect to content being obtained from a network.

BACKGROUND OF THE INVENTION

The popularity of audio and video delivery and playback over the internet has increased significantly in the past years. Some causes of this increase are new compression techniques, the ease with which media player software can be provided as part of a webpage and the exponential increase in bandwidth and storage. Most of this delivery is uncoordinated and ad-hoc, and there is little to no reporting of what content is shared by whom.

It is desirable to keep track of which audio and video content is popular, i.e. is downloaded and/or viewed, at any moment in time. A single website or file sharing network may be able to report items that are popular on that particular site, but aggregating those popularity indicators is difficult. In addition, audio and video can appear on different websites or file sharing networks under different names and/or in edited forms.

Watermarking is a well-known technique for embedding identifiers in content. With the right watermarking algorithm, the identifier can be extracted from the content even after this content has been processed in several different manners, such as resizing, adding a logo, removing frames and so on. Each player would need a watermark detector that extracts the identifier and reports it to the central server. From this the central server can retrieve the right metadata and count the reported item into its popularity statistics. Extracting watermarks is however a resource-consuming operation. In addition, using watermarks to identify content only works when someone has previously inserted the watermark in the content. To day only a small subset of all content is available with watermarked identifiers.

An alternative to watermarking is called robust fingerprinting or robust hashing. With robust fingerprinting it is possible to identify content by matching perceptually relevant features from the content against features of known content in a database. This works for any content, even after modifications such as resizing, adding logos, encoding in a different format and so on. No actions comparable to embedding a watermark are necessary. In this manner, it is possible to add to each player (client) a fingerprinting subroutine that fingerprints every content item that is played and reports this fingerprint to the central server.

WO 2004/010353-A1 discloses a method of sharing multimedia objects such as audio or video, in particular in the context of file sharing networks. The method includes registering usage information relating to such sharing, such as the number of times a multimedia object has been shared, how long the multimedia object lasts, and so on. In an embodiment the multimedia object is identified by having the device that shares the object obtain a digital fingerprint for the object and retrieve associated metadata from a central server. Another embodiment uses watermarks for the same purpose.

This approach however has serious problems with bandwidth and processing power on both server and client. The client must extract an identifier from a watermark in the content or compute a digital fingerprint of every content item and send this identifier or fingerprint to the central server to obtain its associated metadata. Or, alternatively, the client must send a short fragment of audio to the server so that the server can extract the watermarked identifier or calculate a fingerprint for the content, allowing the server to obtain the metadata.

SUMMARY

It is an object of the invention to provide a more efficient way to generate statistics of popular content on networks such as the internet.

This object is achieved by having clients report an easy-to-calculate identifier such as the Internet URL or a cryptographic hash of the content to the server instead of a digital fingerprint. Transmitting such an identifier to the server significantly reduces data transmission requirements and increases speed. The server collects and counts the reported identifiers so as to obtain preliminary statistics. These may not be entirely accurate, as two identifiers may in fact identify the same content under different names, in different formats or at different locations. However by aggregating these reported identifiers into the preliminary statistics, identifiers are revealed that are likely popular content.

Next, the server selects one or more identifiers from the preliminary statistics and makes these available to at least a subset of clients. The clients that obtain these one or more identifiers then play content and compute the easy-to-calculate identifiers as usual. However, if the computed identifier matches one of the identifiers obtained from the server, the client will additionally attempt to extract a watermarked identifier or compute a digital fingerprint of the content in question and report this to the server. The server then uses the received identifier or fingerprint to obtain metadata such as artist and title, and creates the final statistics by combining this metadata with the preliminary statistics.

This reduces the number of watermark detections or digital fingerprints that are computed, as only popular content is processed for this purpose. Because the content is popular, a match is likely to occur soon and then the server can remove the identifier for that content from its 'wanted' list. Thereby, only a few clients will extract watermarks or compute the fingerprint for a particular content item, instead of all of them.

The object is also achieved according to another aspect of the invention in a method of a client terminal identifying content available on a network. The method comprises the steps of obtaining a selection of identifiers of a first kind from a content statistics server, an identifier of the first kind identifying content by means of at least part of the content data, computing an identifier of the first kind while accessing the content, matching the computed identifier of the first kind with the identifiers in the selection, computing an identifier of a second kind if the identifier of the first kind is in the selection, an identifier of the second kind identifying content on the basis of content characteristics, sending the identifier of the second kind associated with the identifier of the first kind to the content statistics server.

In operating the client terminal as described above, identifying the content with an easy-to-calculate identifier, the first kind, from the content data such as name, URL, hash function, etc. and an associated robust identifier, the second kind, based on content characteristics itself irrespective of modification of the content data, it is now possible to combine preliminary statistics from more than one easy-to-calculate identifier indicating the same content and/or aggregate the preliminary statistics with final statistics associated with the identifier of the content of the second kind, independent of the content data. By performing this for a selection of easy-to-calculate identifiers, the processing workload of a client terminal in computing robust identifiers is substantially reduced.

In an embodiment according to the invention, the method further comprises a step of sending only the identifier of the first kind to the content statistics server if the identifier of the first kind is not in the selection. This allows the server to generate the preliminary statistics and to create a selection of identifiers for which it will collect a robust identifier of the second kind.

An identifier of the first kind identifying content by means of at least part of the content data can be easy to calculate as described above, but may vary when the content is manipulated. In an embodiment according to the invention, an identifier of the first kind is computed using at least one of content name, content format, content location, a selection from the content data, an arithmetic function of at least part of the content data and a hash function of at least part of the content data.

In an embodiment of the invention, an identifier of the second kind, based on content characteristics, is an identifier computed using at least one of watermark detection and fingerprint extraction. A watermark is considered to be part of the content as such. Thus providing for the robust identifier of the content irrespective of modifications such as resizing, format, etc. A single unique identifier of the second kind may thus be associated with a plurality of identifiers of the first kind for the same content.

The object is also achieved in a client or client terminal comprising a processing unit for performing the steps of the method of identifying content available on a network as described above.

The object is also achieved in a computer program product, comprising a storage capable of being accessed by a client terminal, having stored thereon computer instructions which when loaded and executed by the client terminal perform the steps of the method of a client terminal identifying content available on a network as described above.

The object is also achieved in a method of a content statistics server generating statistics associated with content available on a network. The method comprises the steps of receiving an identifier of a first kind indicating the content from a client terminal, an identifier of the first kind identifying content by means of at least part of the content data, generating preliminary content statistics associated with the identifier of the first kind, selecting identifiers of the first kind according to a selection criterion based on the generated preliminary content statistics, providing the selection of identifiers of the first kind to a plurality of client terminals, receiving an identifier of a second kind identifier associated with the identifier of the first kind from the list from one of the plurality of client terminals, an identifier of the second kind identifying content on the basis of content characteristics, aggregating the preliminary content statistics into final content statistics associated with the identifier of the second kind.

Using the easy to calculate identifier, of the first kind, and the robust identifier, of the second kind, provided by the client terminal, the server is now enabled to associate the two identifiers and combine or aggregate the preliminary statistics with final statistics associated with the identifier of the content of the second kind, independent of the content data. So more reliable statistics are made available, especially where the same content is be distributed over the network with different names, formats, etc.

In an embodiment according to the invention, wherein the step of selecting identifiers of the first kind according to a selection criterion based on the generated preliminary content statistics comprises the steps of ranking the identifiers by the associated generated preliminary content statistics and selecting a predetermined number of top ranked identifiers of the first kind, it is possible to establish final statistics of content that is ranked most popular on the network, relieving the client terminal and the server of the task of generating final statistics for all the content.

In a further embodiment according to the invention, comprising a step of removing the identifier of the first kind from the selection once an associated identifier of the second kind has been received, allows the list to vary and decrease, thereby further offloading the server and client terminals.

The object is also achieved in another aspect of the invention in a content statistics server arranged for performing the steps of the method of generating statistics associated with content available on a network. In an embodiment the server comprises a processing module for performing the steps of the method of generating statistics associated with content available on a network and a communication module for communicating with a plurality of client terminals via a network, the processing module cooperating with the communication module as described above.

Furthermore, the object is also achieved in another aspect of the invention is also achieved in a computer program product, comprising a storage capable of being accessed by a content statistics server, having stored thereon computer instructions which when loaded and executed by the content statistics server perform the steps of the method of generating statistics associated with content available on a network as described above. The invention further advantageously provides a computer program product being arranged to cause a general purpose computer to operate as the client terminal or server of the invention.

BRIEF DESCRIPTION OF THE FIGURES

These and other aspects of the invention will be apparent from and elucidated with reference to the embodiments shown in the drawing, in which.

Throughout the figures, same reference numerals indicate similar or corresponding features. Some of the features indicated in the drawings are typically implemented in software, and as such represent software entities, such as software modules or objects.

DETAILED DESCRIPTION OF CERTAIN EMBODIMENTS

Figure 1:
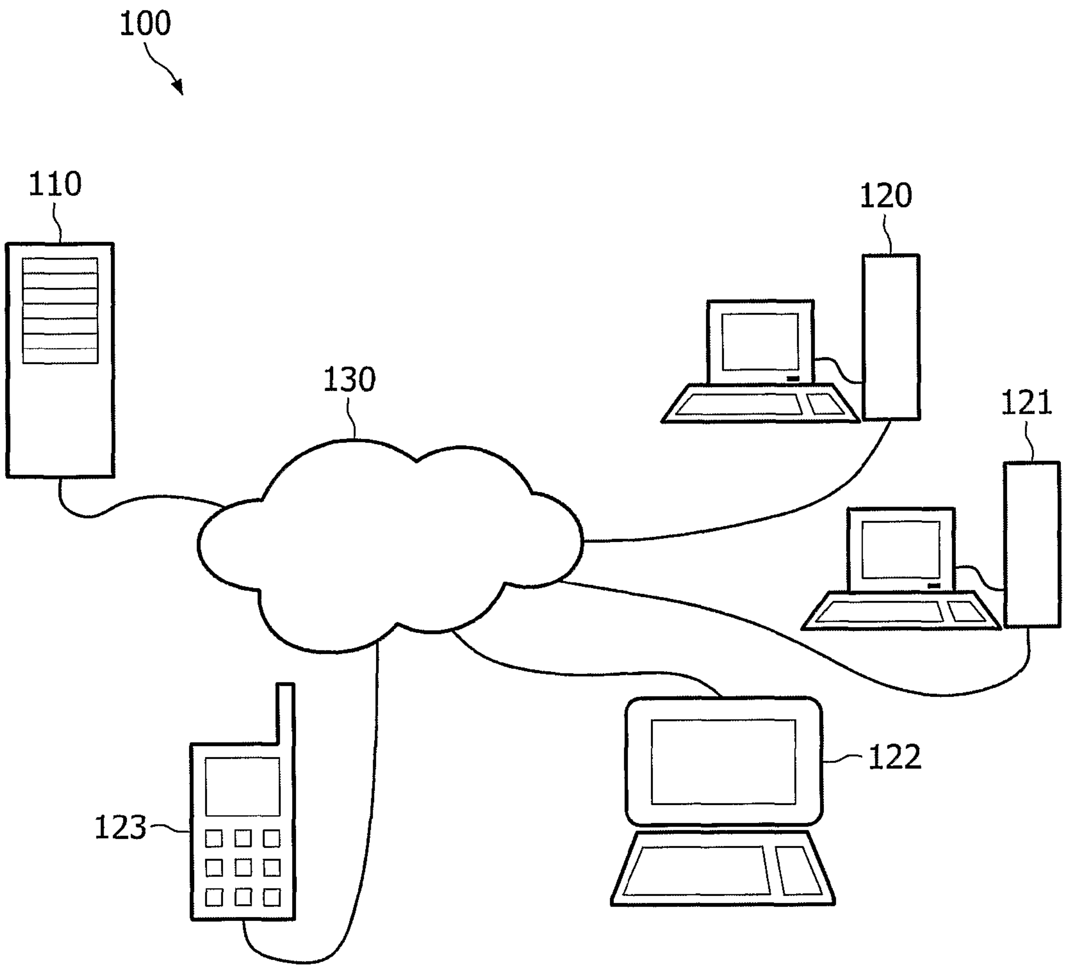
FIG. 1 schematically shows a system comprising a server and a plurality of client terminals connected over a network such as the Internet.

FIG. 1 schematically shows a system 100 comprising a server 110 and a plurality of clients or client terminals 120-123 connected over a network 130 such as the internet. As connecting client terminals to a server over a network is well-known, this will not be elaborated upon further, save to say that any method of doing so now existing or hereafter devised may be used to make this connection possible. The server 110 responsible for generating content statistics may be well known to the skilled person, comprising a processing unit having at least one processor, a memory and a storage, and a communication module such as a network interface for communicating with the clients 120-123 via the network 130. the server is operated by an operating system and specific software for performing the functions and steps a described below.

The clients 120-123 are equipped with hardware and/or software that makes it possible to obtain and play back audio and/or video content such as movies, songs or television programs. In one embodiment, the clients 120-123 are provided with the Microsoft Windows operating system and application software such as Microsoft Windows Media Player, the Realplayer multimedia player, Apple's Quicktime multimedia player or the open source ffmpeg or mplayer software. Other embodiments may employ software such as a player written in the Adobe Flash language that can play movies made available from websites, such as provided at the time of writing from e.g. Google's Youtube video sharing site. Such a player is more platform-independent as it is typically made available as a plugin to a web browser. Again, such hardware and/or software is by itself well-known and so will not be elaborated upon in detail.

The audio and/or video content may be obtained from a great variety of sources. Some likely sources include websites such as Youtube.com, Internet radio stations, podcasts, Apple's iTunes store and file sharing networks such as the Kazaa or Gnutella networks. In addition content may be shared between persons through e-mail or similar one-to-one exchange mechanisms. The method of the invention can be used for content from any source.

Figure 2:
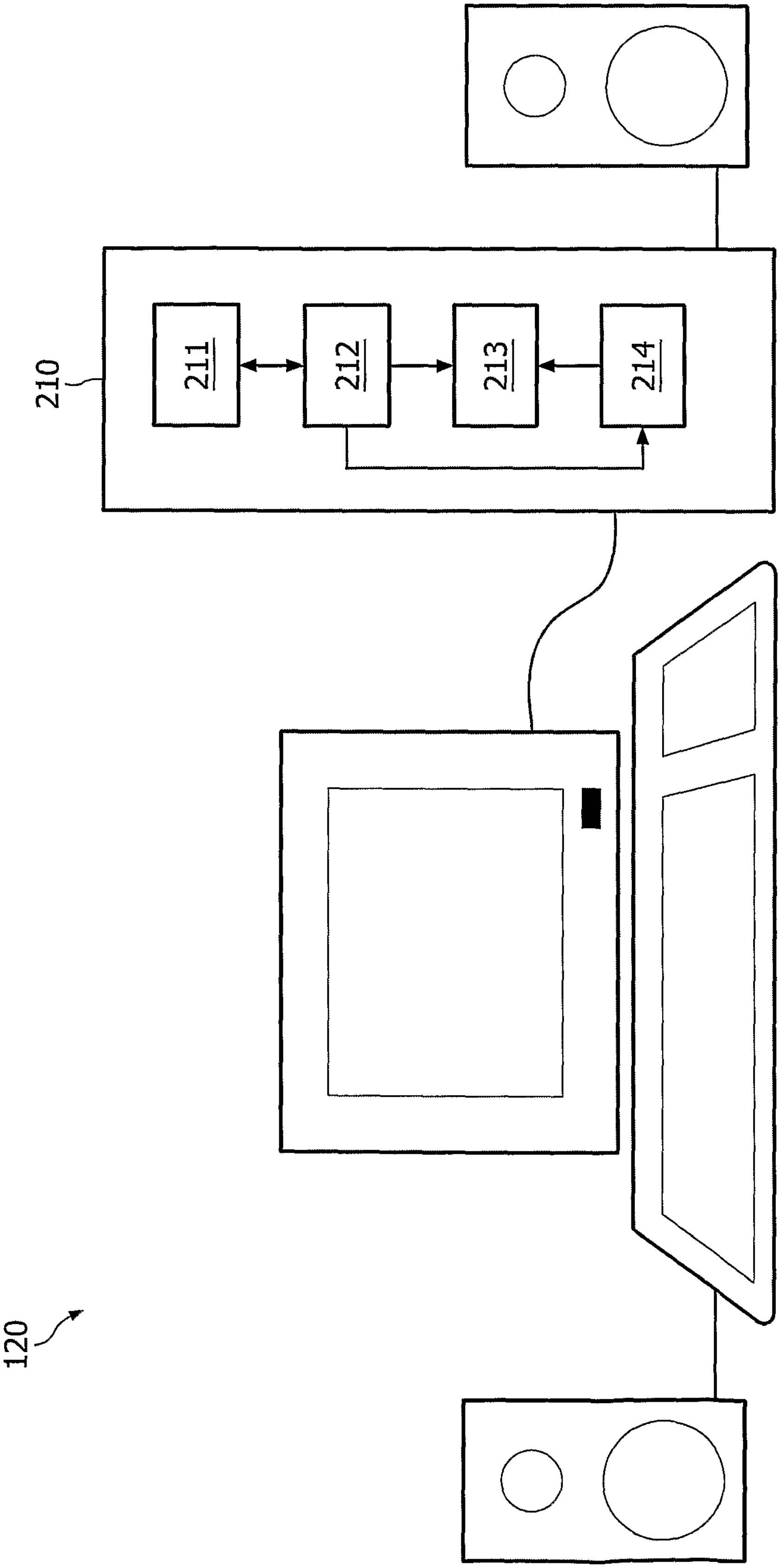
FIG. 2 shows a client in more detail.

FIG. 2 shows the client 120 in more detail. The choice for client 120 is arbitrary; the features discussed here can easily be implemented in any of the clients 121-123 in the same or a corresponding manner. Only those features relevant for understanding the invention are shown.

The client 120 as shown can be a typical desktop personal computer, comprising a keyboard, monitor, speakers and a processing unit 210. Other items such as a mouse and other input means, network connections, storage means and so on have been omitted from the figure for the sake of clarity. The network connection may be established using well known network interfaces using network protocols such as Ethernet, TCP/IP etc.

Not shown in FIG. 2, but it will be clear to the skilled person that the client 120 can also be a mobile phone comprising a transceiver module for communicating wirelessly via a mobile telecommunication network such as GSM, GPRS, UMTS, WIFI or WLAN, etc., capable of establishing a network connection with server 110, a speaker or an audio output, a display, keyboard and the like.

The client 120 is equipped with media playback software 211 that is configured for playing audiovisual media retrieved via the network 130. As noted above, this software 211 could be for example Microsoft Windows Media Player or an Adobe Flash-based player embedded in a web browser.

An advantage of using Adobe Flash as the basis for a player is that Flash is a widely-used platform for developing rich multimedia applications. A web browser is provided with a plugin that implements a rendering engine or virtual machine for Flash-based applications. The engine includes specialized components for playback of content in specific format. Using ActionScript a developer can add interactivity to Flash-based applications. Because most of the necessary components are provided with the engine, an application developer does not have to re-implement these himself. In addition, this enables an embodiment of the invention where the modules 212 and 213 (discussed below) are implemented as part of the Flash rendering engine or virtual machine.

In such an embodiment these modules can operate independently of the application that invokes the playback of content. In addition the modules can be distributed as part of the plugin download, so that users only have to download and install the code once.

In accordance with the invention the client 121 is further equipped with a hardware and/or software module 212 that is configured to compute an identifier for content that is being accessed and played. This identifier can be computed in various way, for example using any cryptographic hash function such as SHA-1 or MD5. Alternatively a Cyclic Redundancy Check algorithm or similar technique can be used. The identifier can also be derived from e.g. its Internet Uniform Resource Locator (URL) or Web address, or from any identifier that accompanies the content, or from a combination of some or all of the preceding. The object is to provide an easy-to-calculate identifier based on the data, which is not necessarily robust against transformations of the content, but which is the same when other clients calculate the identifier for the same file.

In one embodiment the module 212 computes the identifier as a cryptographic hash over a predetermined first part, for example the first ten seconds of data, of the content. In this computation items from the file that are known to be substantially similar among different content items, such as standard headers prescribed by the encoding format used for the content, can be skipped. The length of the content may be added to the identifier to distinguish between content items that start with the same or similar audiovisual content, for example news reports with standard opening tunes and/or animations.

Alternatively a first few bytes of the content may be read by module 212 and used as identifier. Also a field of a content file may be extracted and used as identifier. The content may be decompressed and some part of it may be taken for the module 212 to compute the identifier. Also an arithmetic function may be applied to part of the content data to compute the easy to calculate identifier.

In another embodiment a predetermined initial part may be skipped from the content, for example the first ten or thirty seconds of data, as such initial part may contain an advertisement instead of a section of the actual content.

The identifier can be augmented by adding some metadata that accompanies the content, such as the file length, date of last modification or number of frames. Other metadata that can be used includes embedded text listing author, title, producer, and so on, but such metadata may be unreliable.

For example, the module 212 may calculate an identifier that is 100 bytes in length as follows: derive six 128-bits MD5 hash values and concatenate four bytes of the file length to these 96 bytes. The six MD5 hash values are computed over different segments of the content. For instance the first six 10-second fragments, or six blocks of one megabyte of data. Selection of the fragments can be done after skipping the first ten seconds or first megabyte of data, to avoid including advertisements or header data, as explained above.

The identifier may be computed from the data as it is received, i.e. in its original encoded form, or from the data after it has been processed by the client. Typical audio or video streams are encoded in a format such as MPEG-2, MPEG-4, DivX, MP3, Windows Media, H.263, H.264, Sorenson Spark or TrueMotion VP6, and then transmitted as a data stream to the client. The client 120-123 decodes the data, which may involve stripping or removing some of the data, such as checksums or metadata.

In accordance with the invention the client 120 uses transmission module 213 to send this identifier to the server 110 via the network 130. Note that the server 110 is not necessarily the same entity that delivered the content item in question to the client 120.

The module 212 and 213 may be equipped to only send a particular identifier once during a certain time period, for example only once a day. That prevents double counting when the same content is played multiple times during that time period. The module 213 may additionally include information about the client and/or the user when sending the identifier. The modules 212 and 213 may be configured to send multiple identifiers and/or other information at once, for example once every hour or once every ten identifiers, instead of sending each identifier separately as it is obtained. If transmission to the server 110 fails, the module 213 may retry transmission one or more times or add the information from the failed transmission to a later transmission.

The invention assumes that the module 212 is installed on a plurality of clients 120-123. The server 110 consequently receives a potentially large amount of these computed identifiers from plural sources. A significant subset of these identifiers will be the same, as many clients will report identifiers for the same content obtained from the same location.

The server 110 derives preliminary statistics from the received identifiers by recording for each distinct identifier how many times it has been received. Other statistical information, such as date(s) and/or time(s) of receipt, geographical or network location of clients reporting particular identifier(s) and so on may be recorded as well.

From these preliminary statistics the server 110 identifies the most popular content items over a certain time period. For example the server 110 may identify the hundred most popular videos of a particular day. These statistics are preliminary as they are based solely on the reported identifiers, and no check has yet been performed on the uniqueness of the identifier. Two different identifiers may correspond to the same content item in a different format, in modified form or from a different source. In addition, there is not necessarily a correspondence yet between identifiers and metadata such as artist, performer, title, composer or year of publication.

The server 110 may be equipped with means for obtaining metadata for some or all of the provided identifiers. If the identifier comprises a network location such as an Internet URL, the server 110 can alternatively attempt to retrieve the content from that network location and identify the retrieved content by detecting a watermark, computing a fingerprint or reading metadata accompanying the content. However location information may not always be available, or when it is available may not be accurate or accessible to the server 110. For instance the network location could be password-protected or accessible for paying subscribers only.

Accordingly, the server 110 is configured to create one or more lists with identifiers that are shown to be popular in the preliminary statistics. The server 110 can make one list with e.g. the top 100 or top 1000 items in the preliminary statistics, or make multiple lists that each identify a different subset of this top 100 or top 1000. The subsets could be chosen (pseudo-)randomly or in an ordered fashion, for example the first list with the top 10, the second list with items 11-20, the third with items 21-30 and so on. Lists may overlap partially or wholly. For example one list may be a subset of another list. These one or more lists are hereafter referred to as the 'wanted lists'.

Next, the server 110 makes the one or more wanted lists available to at least a subset of the clients 120-123. Many techniques exist to do so. The server 110 may post the wanted lists on a publicly accessible network location, allowing clients 120-123 to retrieve one, some or all of the lists from this location. The server 110 may send one, some or all of the lists to a particular client when that client reports identifiers to the server 110, for example in a response acknowledging safe receipt of the reported identifiers. Other techniques for push- or pull-based delivery of these lists to clients can of course also be used. The wanted lists can also be distributed in a peer-to-peer fashion. Essentially in such embodiments a client passes one or more of the lists in its possession to other clients. This alleviates the number of requests for wanted lists at the server 110.

When the server 110 uses a push-based mechanism to make the one or more wanted lists available, the server 110 may push these lists to all clients he can reach, or to a selected subset of the clients. The selection can be done with a wide variety of criteria. One criterion that may be particularly useful is the capabilities of the clients. Some clients may be embodied as handheld devices or mobile phones, while others may be powerful personal computers. Since fingerprint detection and/or watermark detection requires significant processing capabilities, the server 110 may elect to push the list only to clients that are deemed powerful enough. This requires that the clients somehow report their capabilities or certain details of their hardware configurations (e.g. computer type, CPU speed, amount of memory) to the server 110.

This same criterion can also be used in pull-based mechanisms. In such embodiments the client must report its capabilities when requesting a copy of the list, so that the server 110 can determine if the client is powerful enough. The client may be provided with a limited list or even an empty list if the determination is negative.

For the sake of explanation it is assumed that client 120 obtains one of the wanted lists from the server 110. Playback of content proceeds as usual, and the module 212 computes the identifier as usual as well. However, the module 212 now additionally verifies if the computed identifier occurs on the obtained wanted list. If so, the module 212 activates a fingerprinting module 214 in order to obtain a robust fingerprint for the content item that is currently being downloaded and/or played.

The module 214 computes a robust fingerprint for this content item, and passes the fingerprint to the transmission module 213, which in turn transmits the fingerprint together with the identifier to the server 110. This transmission may occur together with the usual delivery of identifiers. The module 213 may additionally include information about the client and/or the user when sending the fingerprint. The module 213 may be configured to send multiple fingerprints at once, for example once every hour or once every ten fingerprints, instead of sending each fingerprint separately as it is obtained. If transmission to the server 110 fails, the module 213 may retry transmission one or more times or add the information from the failed transmission to a later transmission.

Many techniques exist for the computation of robust fingerprints. One method for computing a robust fingerprint is described in international patent application WO 02/065782. An overview of some audio fingerprinting techniques may be found in P. Cano e.a., 'A Review of Audio Fingerprinting', *The Journal of VLSI Signal Processing* 41(3), p. 271-283. Video fingerprinting algorithms are known e.g. from J. Oostveen, T. Kalker, J. Haitsma: "Feature Extraction and a Database Strategy for Video Fingerprinting". 117-128. IN: Shi-Kuo Chang, Zhe Chen, Suh-Yin Lee (Eds.): *Recent Advances in Visual Information Systems, 5th International Conference*, VISUAL 2002 Hsin Chu, Taiwan, Mar. 11-13, 2002, Proceedings. Lecture Notes in Computer Science 2314 Springer 2002.

The computed fingerprint should be long enough to permit reliable detection by matching the fingerprint against known candidates recorded in a database available to the server 110. This does not necessarily mean that the fingerprint should be computed over the whole content. Several fingerprinting techniques already can reliably identify content from a 10- or 30-second fragment. This advantageously reduces the data that needs to be sent as well as the time it takes to compute the fingerprint. This also makes it possible to compute a fingerprint even when some part of the content has already been deleted from a buffer or other temporary memory.

When the server 110 receives a robust fingerprint for a particular identifier, that identifier can be removed from the wanted lists. This could be done immediately or after a certain time period, to ensure that multiple robust fingerprints from different sources are obtained for the particular identifier. This reduces the chances of a miscalculated or otherwise unusable fingerprint spoiling the results.

Using the thus-received robust fingerprints the server 110 is able to determine which identifiers in fact correspond to the same content. This works best when the robust fingerprint covers substantially the whole content item. With fingerprints for only fragments of the content, it may be more difficult to determine that two identifiers correspond to the same item.

When two identifiers are found to correspond to a single content item, the statistics associated with these identifiers can then be aggregated into a single item.

The server 110 can use the robust fingerprint to obtain metadata for the content item. To this end, the server 110 needs access to a database with fingerprints and associated metadata for known content items. The obtained metadata is then combined with the statistical data to produce the final statistics, which can be published, reported or transmitted to others in a large variety of ways.

Various enhancements are possible to improve the workings of the clients. For example, the client 120 may further comprise a user profile maintenance module which maintains a user profile for the user. Such a profile comprises information regarding the user's browsing habits, lifestyle, interests, favorite search keywords and other information that can be gathered by observing the user's browsing behavior. This allows, among other things, the client 120 to recommend content that may be of interest to the user, or to filter out multimedia objects that are less likely to be of interest. All or part of this profile can be sent to the server together with computed identifiers and/or fingerprints.

An important aspect of any technology that monitors users is of course privacy. Several options are available to alleviate privacy concerns or to entice users to allow monitoring of their viewing and listening habits. A first possibility is to offer the user an option to enable or disable the method of the invention. The user may be asked during installation whether to enable this method, and/or can be offered a configuration setting in one of the player's menu to enable or disable the method at any time. An alternative is to send the data in an anonymized fashion, for example by omitting user-identifying data such as username. In some situations it may be possible to send the data without even revealing the IP address of the user's computer.

In an alternative embodiment identifiers embedded in content using digital watermarks could be used. The client 120 then comprises a watermark detector arranged to detect a watermark in the content being played and to extract the identifier from the watermark. Watermarking, the process of inserting extra information in a signal such as an audio or video signal, is an important and well-known technique to mark or protect those signals. Note that some watermark detection algorithms operate in the compressed domain, while others operate on decoded frames.

The information transmitted from the client to the server should be protected against unauthorized modifications, as those could adversely affect the reliability of the produced statistics. The module 213 could be provided with some authentication mechanism, e.g. a key to generate a digital signature or message authentication code to accompany information to be transmitted to the server 110.

Before starting the fingerprint computation, the client 120 may verify with the server 110 whether the list is still accurate and the fingerprint for this content item is still desired.

It should be noted that the above-mentioned embodiments illustrate rather than limit the invention, and that those skilled in the art will be able to design many alternative embodiments without departing from the scope of the appended claims.

In the claims, any reference signs placed between parentheses shall not be construed as limiting the claim. The word "comprising" does not exclude the presence of elements or steps other than those listed in a claim. The word "a" or "an" preceding an element does not exclude the presence of a plurality of such elements.

The invention can be implemented by means of hardware comprising several distinct elements, and by means of a suitably programmed computer. In the device claim enumerating several means, several of these means can be embodied by one and the same item of hardware. The mere fact that certain measures are recited in mutually different dependent claims does not indicate that a combination of these measures cannot be used to advantage.

The invention claimed is:

1. A method of a client terminal identifying content available on a network, the content comprising content data and the method comprising:

obtaining a selection of identifiers of a first kind from a content statistics server device, an identifier of the first kind being calculatable and identifying content by means of at least part of the content data;

computing an identifier of the first kind while accessing the content;

matching the computed identifier of the first kind with the identifiers in the selection;

computing an identifier of a second kind if the identifier of the first kind is in the selection, an identifier of the second kind being robust and identifying content on the basis of content characteristics;

sending the identifier of the second kind associated with the identifier of the first kind to the content statistics server device.

2. The method according to claim 1, further comprising sending only the identifier of the first kind to the content statistics server device if the identifier of the first kind is not in the selection.

3. The method according to claim 1, wherein an identifier of the first kind is computed using at least one of content name, content format, content location, a selection from the content data, an arithmetic function of at least part of the content data and a hash function of at least part of the content data.

4. The method according to claim 1, wherein an identifier of the second kind is an identifier computed using at least one of watermark detection and fingerprint extraction.

5. A client terminal comprising a processing unit for performing the method of identifying content available on a network according to claim 1.

6. A computer program product, comprising a storage device accessible by a client terminal, having stored thereon computer instructions, which when loaded and executed by the client terminal perform the method of a client terminal identifying content available on a network according to claim 1.

7. A method of a content statistics server device generating statistics associated with content available on a network, the content comprising content data and the method comprising:
- receiving an identifier of a first kind indicating the content from a client terminal, an identifier of the first kind being calculatable and identifying content by means of at least part of the content data;
- generating preliminary content statistics associated with the identifier of the first kind;
- selecting identifiers of the first kind according to a selection criterion based on the generated preliminary content statistics;
- providing the selection of identifiers of the first kind to a plurality of client terminals;
- receiving an identifier of a second kind identifier associated with the identifier of the first kind from the list from one of the plurality of client terminals, an identifier of the second kind being robust and identifying content on the basis of content characteristics;
- aggregating the preliminary content statistics into final content statistics associated with the identifier of the second kind.

8. The method according to claim 7, wherein the selecting identifiers of the first kind according to a selection criterion based on the generated preliminary content statistics comprises:
- ranking the identifiers by the associated generated preliminary content statistics; and
- selecting a predetermined number of top ranked identifiers of the first kind.

9. The method according to claim 7, further comprising removing the identifier of the first kind from the selection once an associated identifier of the second kind has been received.

10. The method according to claim 7, wherein an identifier of the first kind is computed using at least one of content name, content format, content location, a selection from the content data, an arithmetic function of at least part of the content data and a hash function of at least part of the content data.

11. The method according to claim 7, wherein an identifier of the second kind is an identifier computed using at least one of watermark detection and fingerprint extraction.

12. A content statistics server device arranged for performing the method of generating statistics associated with content available on a network according to claim 7.

13. The content statistics server device according to claim 12, comprising a processing module for performing the method of generating statistics associated with content available on a network according to claim 7 and a communication module for communicating with a plurality of client terminals via a network, the processing module cooperating with the communication module.

14. A computer program product, comprising a non-transitory storage device accessible by a content statistics server device, having stored thereon computer instructions which when loaded and executed by the content statistics server device perform the method of generating statistics associated with content available on a network according to claim 7.

* * * * *